(12) United States Patent
Huang et al.

(10) Patent No.: US 12,447,359 B2
(45) Date of Patent: Oct. 21, 2025

(54) NEUTRON BEAM SOURCE GENERATION SYSTEM COMPRISING AN ACCELERATOR, A TARGET, AND A NEUTRON BEAM SOURCE STABILIZATION CONTROL SYSTEM, AND NEUTRON BEAM SOURCE GENERATION METHOD

(71) Applicant: Heron Neutron Medical Corp., Zhubei (TW)

(72) Inventors: Kuan-Yan Huang, Zhubei (TW); Shan-Haw Chiou, Zhubei (TW); Chih-Chung Lin, Zhubei (TW); Siao-Cing Liou, Zhubei (TW)

(73) Assignee: HERON NEUTRON MEDICAL CORP., Zhubei (TW)

( * ) Notice: Subject to any disclaimer, the term of this patent is extended or adjusted under 35 U.S.C. 154(b) by 251 days.

(21) Appl. No.: 18/315,784

(22) Filed: May 11, 2023

(65) Prior Publication Data
US 2024/0238618 A1   Jul. 18, 2024

(30) Foreign Application Priority Data
Jan. 13, 2023   (TW) ................. 112101492

(51) Int. Cl.
*A61N 5/10*   (2006.01)
*H05H 3/06*   (2006.01)

(52) U.S. Cl.
CPC ............. *A61N 5/1075* (2013.01); *A61N 5/10* (2013.01); *A61N 5/1078* (2013.01); *H05H 3/06* (2013.01);
(Continued)

(58) Field of Classification Search
CPC .............. A61N 5/10; A61N 2005/1074; A61N 5/1075; A61N 5/1077; A61N 5/1078;
(Continued)

(56) References Cited

U.S. PATENT DOCUMENTS

| 7,939,809 B2 * | 5/2011 | Balakin ............. A61N 5/10 315/504 |
| 8,129,699 B2 * | 3/2012 | Balakin ............. A61N 5/1049 250/492.1 |

(Continued)

FOREIGN PATENT DOCUMENTS

WO    WO 2022/017193 A1    1/2022

OTHER PUBLICATIONS

Extended European Search Report for European Application No. 23174756.9, dated Nov. 23, 2023.

*Primary Examiner* — Allen C. Ho
(74) *Attorney, Agent, or Firm* — Birch, Stewart, Kolasch & Birch, LLP (57) ABSTRACT

A neutron beam source generation system, a neutron beam source stabilization control system, and a neutron beam source generation method are provided. The neutron beam source generation system includes an accelerator, a target, and a calibration module. The accelerator is configured to generate a proton beam. A neutron beam source is generated by irradiating the target with the proton beam. The calibration module includes a pair of electromagnet components, a profile-measuring component, a current-measuring component, and a Faraday cup component. The calibration module uses the pair of electromagnet components to control the distribution of the proton beam according to the profile distribution of the proton beam as measured by the profile-measuring component. The calibration module adjusts the current of the proton beam according to the first current value as measured by the current-measuring component, the second current value as measured by the Faraday cup component, or both.

21 Claims, 9 Drawing Sheets

(52) U.S. Cl.
CPC .... *A61N 2005/1087* (2013.01); *A61N 2005/109* (2013.01); *A61N 2005/1094* (2013.01); *H05H 2242/10* (2013.01)

(58) Field of Classification Search
CPC .......... A61N 5/1079; A61N 2005/1087; A61N 2005/109; A61N 2005/1094; H05H 3/06
USPC ........... 250/396 R, 397, 398, 396 ML, 492.3
See application file for complete search history.

(56) References Cited

U.S. PATENT DOCUMENTS

| | | | | |
|---|---|---|---|---|
| 8,178,859 B2* | 5/2012 | Balakin | ................ | A61N 5/1048 |
| | | | | 250/492.1 |
| 8,791,435 B2* | 7/2014 | Balakin | ................ | G21K 1/087 |
| | | | | 250/492.1 |
| 9,370,089 B2* | 6/2016 | Ungaro | ................ | A61N 5/1077 |
| 9,889,320 B2* | 2/2018 | Liu | ................ | H05H 3/06 |
| 10,155,123 B2* | 12/2018 | Mukawa | ................ | G01T 1/29 |
| 10,157,693 B2* | 12/2018 | Liu | ................ | A61N 5/10 |
| 10,328,286 B2* | 6/2019 | Liu | ................ | G21G 4/02 |
| 10,434,333 B2* | 10/2019 | Liu | ................ | H05H 3/06 |
| 10,537,750 B2* | 1/2020 | Liu | ................ | A61N 5/1049 |
| 10,556,127 B2* | 2/2020 | Liu | ................ | A61N 5/1082 |
| 10,639,499 B2* | 5/2020 | Liu | ................ | G21K 1/10 |
| 10,744,345 B2* | 8/2020 | Liu | ................ | A61N 5/1042 |
| 10,773,104 B2* | 9/2020 | Liu | ................ | H05H 3/06 |
| 10,791,618 B2* | 9/2020 | Hsueh Liu | ................ | H05H 3/06 |
| 10,898,731 B2* | 1/2021 | Liu | ................ | A61N 5/1077 |
| 10,898,733 B2* | 1/2021 | Liu | ................ | A61N 5/1081 |
| 10,926,108 B2* | 2/2021 | Liu | ................ | A61N 5/1042 |
| 10,926,110 B2* | 2/2021 | Liu | ................ | A61N 5/10 |
| 11,058,898 B2* | 7/2021 | Liu | ................ | A61N 5/1064 |
| 11,198,023 B2* | 12/2021 | Chen | ................ | G21K 5/04 |
| 11,224,766 B2* | 1/2022 | Liu | ................ | A61K 41/0095 |
| 11,246,209 B2* | 2/2022 | Sasai | ................ | H05H 7/001 |
| 11,266,859 B2* | 3/2022 | Liu | ................ | H05H 3/06 |
| 11,338,155 B2* | 5/2022 | Hsiao | ................ | H05H 3/06 |
| 11,400,314 B2* | 8/2022 | Hsiao | ................ | H05H 3/06 |
| 11,458,336 B2* | 10/2022 | Tsai | ................ | A61N 5/1064 |
| 11,559,705 B2* | 1/2023 | Chen | ................ | A61K 41/0095 |
| 11,561,308 B2* | 1/2023 | Liu | ................ | G01N 33/6803 |
| 11,583,701 B2* | 2/2023 | Liu | ................ | A61N 5/1077 |
| 11,740,370 B2* | 8/2023 | Liu | ................ | H05H 3/06 |
| | | | | 250/391 |
| 11,813,483 B2* | 11/2023 | Liu | ................ | G21K 5/04 |
| 12,083,361 B2* | 9/2024 | Pirogov | ................ | A61N 5/1067 |
| 12,324,087 B2* | 6/2025 | Lin | ................ | A61N 5/1078 |
| 2022/0062657 A1 | 3/2022 | Pirogov et al. | | |

* cited by examiner

NEUTRON BEAM SOURCE GENERATION SYSTEM COMPRISING AN ACCELERATOR, A TARGET, AND A NEUTRON BEAM SOURCE STABILIZATION CONTROL SYSTEM, AND NEUTRON BEAM SOURCE GENERATION METHOD

CROSS REFERENCE TO RELATED APPLICATIONS

This Application claims priority of Taiwan Patent Application No. 112101492, filed on Jan. 13, 2023, the entirety of which is incorporated by reference herein.

BACKGROUND OF THE INVENTION

Field of the Invention

The present disclosure is related to a neutron beam source generation system, a neutron beam source stabilization control system, and a neutron beam source generation method, and, in particular, it is related to a neutron beam source generation system, a neutron beam source stabilization control system, and a neutron beam source generation method with a stable proton beam.

Description of the Related Art

Neutron capture therapy (NCT) is a type of radiation therapy that is carried out by delivering an element with better neutron absorption to a specific location, then performing a selective treatment by using the difference in the degree of neutron absorption of different elements, thereby precisely destroying cancer cells without destroying other healthy tissues.

Specifically, a neutron beam source for treatment may be formed by generating a proton beam with a particle accelerator and then irradiating a target with the proton beam. However, existing neutron capture therapy devices do not monitor the proton beam in real time, so it is difficult to ensure the stability of the neutron beam source. While existing neutron capture therapy devices have progressively met their intended purposes, they are not entirely satisfactory in every respect. Therefore, there are still some issues to be solved with neutron capture therapy devices.

BRIEF SUMMARY OF THE INVENTION

A neutron beam source generation system is provided according to some embodiments of the present disclosure. The neutron beam source generation system includes an accelerator, a target, and a calibration module. The accelerator is configured to generate a proton beam that is transmitted in a first direction along a channel. The target is at one end of the channel, wherein a neutron beam source is generated by irradiating the target with the proton beam. The calibration module is disposed in the channel and includes a pair of electromagnet components, a profile-measuring component, a current-measuring component, and a Faraday cup component. The pair of electromagnet components are configured to control distribution of the proton beam in a second direction and in a third direction. The profile-measuring component is configured to measure the proton beam to obtain a profile distribution. The current-measuring component is configured to measure the proton beam to obtain a first current value. The Faraday cup component is configured to optionally shield the proton beam and measure the proton beam to obtain a second current value. The calibration module controls the distribution of the proton beam in the second direction and in the third direction by the pair of electromagnet components according to the profile distribution, and adjusts the current of the proton beam according to the first current value, the second current value, or both.

A neutron beam source generation method is provided according to some embodiments of the present disclosure. The neutron beam source generation method is applied to a neutron beam source generation system, and the neutron beam source generation system includes an accelerator, a target, and a calibration module. The neutron beam source generation method includes the following steps. The accelerator generates a proton beam that is transmitted in a first direction along a channel. The current-measuring component of the calibration module measures the proton beam to obtain a first current value. The Faraday cup component of the calibration module measures the proton beam to obtain a second current value. The current of the proton beam is adjusted according to the first current value, the second current value, or both. The profile-measuring component of the calibration module measures the proton beam to obtain the profile distribution. The pair of electromagnet components of the calibration module adjust the distribution of the proton beam in the second direction and in the third direction according to the profile distribution. When the first current value, the second current value, and the profile distribution all meet their preset values, the Faraday cup component is removed so that the proton beam irradiates the target to generate a neutron beam source.

A neutron beam source stabilization control system is provided according to some embodiments of the present disclosure. The neutron beam source stabilization control system is disposed between an accelerator and a target. The accelerator is configured to generate a proton beam that is transmitted in a first direction along a channel, and the target is at one end of the channel. A neutron beam source is generated by irradiating the target with the proton beam. The neutron beam source stabilization control system includes a calibration module disposed between the accelerator and the target. The calibration module includes a pair of electromagnet components, a profile-measuring component, a current-measuring component, and a Faraday cup component. The pair of electromagnet components are configured to control distribution of the proton beam in a second direction and in a third direction. The profile-measuring component is configured to measure the proton beam to obtain the profile distribution. The current-measuring component is configured to measure the proton beam to obtain a first current value. The Faraday cup component is configured to optionally shield the proton beam and measure the proton beam to obtain a second current value. The calibration module controls the distribution of the proton beam in the second direction and in the third direction according to the profile distribution using the pair of electromagnet components, and the calibration module adjusts the current of the proton beam according to the first current value, the second current value, or both.

The neutron beam source generation system, the neutron beam source stabilization control system, and the neutron beam source generation method disclosed herein may be applied to various types of neutron capture therapy systems. In order to make the features or advantages of the present disclosure more comprehensible, some embodiments are illustrated hereinafter, and detailed descriptions are provided with reference to the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

The following disclosure provides many different embodiments, or examples, for implementing different features of the provided neutron beam source generation system, neutron beam source stabilization control system, and neutron beam source generation method. Specific examples of features and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The directional terms mentioned herein, such as "up", "down", "left", "right" and similar terms refer to the directions in the drawings. Accordingly, the directional terms used herein are to illustrate, not to limit, the present disclosure.

In some embodiments of the present disclosure, terms about disposing and connecting, such as "disposing", "connecting" and similar terms, unless otherwise specified, may refer to two features are in direct contact with each other, or may also refer to two features are not in direct contact with each other, wherein there is an additional connect feature between the two features. The terms about disposing and connecting may also include the case where both features are movable, or both features are fixed.

In addition, ordinal numbers such as "first", "second", and the like used in the specification and claims are used to modify different features or to distinguish different embodiments or ranges, rather than to limit the number, the upper or lower limits of features, and are not intended to limit the order of manufacture or arrangement of features.

The term "about" used herein generally means within 10%, within 5%, within 3%, within 2%, within 1%, or within 0.5% of a given value or a given range. The value given herein is an approximate value, that is, the meaning of "about" may still be implied without the specific description of "about".

Unless otherwise defined, all terms including technical and scientific terms used herein have the same meaning as commonly understood by a person of ordinary skills in the art. It should be understood that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

Some variations of the embodiments are described hereinafter. In different figures and described embodiments, the same or similar reference numerals are used to refer to the same or similar features. It is understood that additional steps may be provided before, during, and after the method, and that some described steps may be replaced or deleted for other embodiments of the method.

Figure 1:
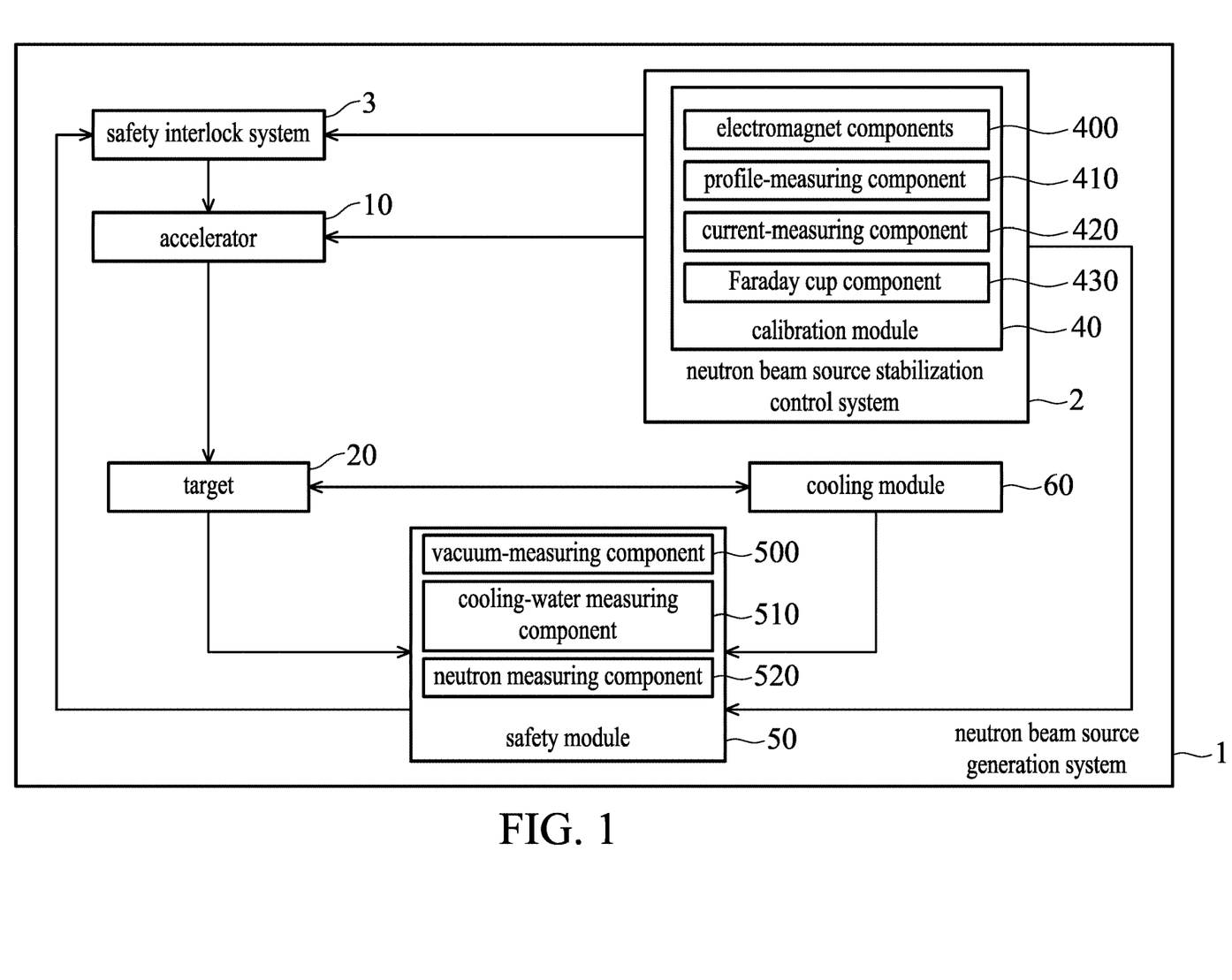
FIG. 1 is a block diagram of a neutron beam source generation system according to some embodiments of the present disclosure.
Figure 2:
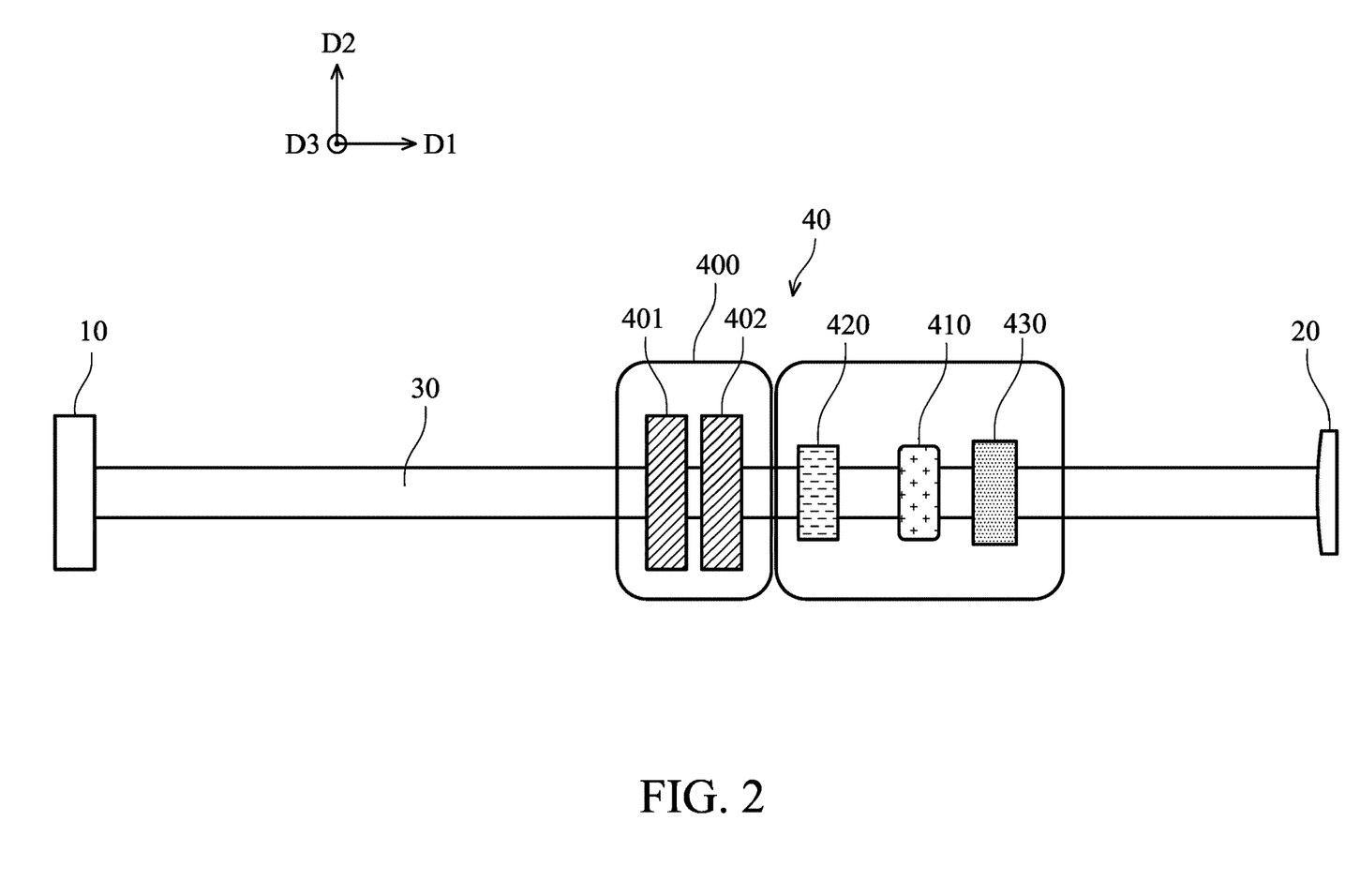
FIG. 2 is a schematic diagram of an accelerator, a calibration module, and a target according to some embodiments of the present disclosure.

Referring to FIG. 1 and FIG. 2. FIG. 1 is a block diagram of a neutron beam source generation system according to some embodiments of the present disclosure, and FIG. 2 is a schematic diagram of an accelerator, a calibration module, and a target according to some embodiments of the present disclosure. In some embodiments, the neutron beam source generation system 1 includes an accelerator 10, a target 20, and a neutron beam source stabilization control system 2, which may be used to generate a stable neutron beam source. In some embodiments, a neutron beam may be formed by making a neutron beam source generated by the above elements to focus, and then neutron capture therapy may be performed by the neutron beam. That is, the neutron beam source generation system 1 of the present disclosure may be applied in a neutron capture therapy device. However, the present disclosure is not limited thereto. In other embodiments, the neutron beam source generated by the above elements may also be applied to other devices that need to use neutron beams. The detailed structure of the neutron beam source generation system 1 is described hereinafter.

As shown in FIG. 2, in some embodiments, the accelerator 10 is configured to generate a proton beam that is transmitted in a first direction D1 toward the target 20 along a channel 30. In some embodiments, the accelerator 10 may be a cyclotron, a linear accelerator, another suitable accelerator, or a combination thereof, but the present disclosure is not limited thereto. In some embodiments, the interior of channel 30 may be in a vacuum state. In some embodiments, the target 20 is at one end of the channel 30. A neutron beam source may be generated by irradiating the target 20 with the proton beam. For example, the target 20 may be located within the channel 30, or located outside the channel 30 but connected to and in contact with the channel 30. In some embodiments, the material of the target 20 may be or include lithium (Li), beryllium (Be), other suitable materials, or combinations thereof, but the present disclosure is not limited thereto.

In some embodiments, the neutron beam source stabilization control system 2 may include a calibration module 40. In some embodiments, the calibration module 40 is disposed between two ends of the channel 30. The proton beam may be measured and calibrated by the calibration module 40, so that the proton beam may stably irradiate the target 20, thereby generating a stable neutron beam source.

In some embodiments, the calibration module 40 may include a pair of electromagnet components 400 for controlling distribution of the proton beam in a second direction D2 and in a third direction D3. In some embodiments, the pair of electromagnet components 400 may be or include a pair of quadrupole magnets, other suitable electromagnets, or a combination thereof, but the present disclosure is not limited thereto. By adjusting the current input to the quadrupole magnets, the magnetic field of the quadrupole magnets may be changed to focus or defocus the proton beam. Taking FIG. 2 as an example, the pair of electromagnet components 400 may include quadrupole magnets 401 and quadrupole magnets 402. The quadrupole magnets 401 is configured to control the distribution of the proton beam in the second direction D2, and the quadrupole magnets 402 is configured to control the distribution of the proton beam in the third direction D3. The term "distribution" herein may refer to Gaussian distribution, but the present disclosure is not limited thereto. In some embodiments, the first direction D1, the second direction D2, and the third direction D3 are perpendicular to each other, but the present disclosure is not limited thereto. In some embodiments, the first direction D1 is perpendicular to the second direction D2 and the third direction D3, but the second direction D2 is not perpendicular to the third direction D3.

In some embodiments, the calibration module 40 further includes a profile-measuring component 410 for measuring the proton beam to obtain a profile distribution. In some embodiments, the profile-measuring component 410 may be or include a beam profiler monitor (BPM), other suitable measuring devices, or a combination thereof, but the present disclosure is not limited thereto. In some embodiments, the calibration module 40 may control the distribution of the proton beam in the second direction D2 and in the third direction D3 by the pair of electromagnet components 400 according to the profile distribution as measured by the profile-measuring component 410.

In some embodiments, the calibration module 40 further includes a current-measuring component 420 for measuring the proton beam to obtain a first current value. In some embodiments, the current-measuring component 420 may be or include a continuous wave current transformer (CWCT), other suitable measuring devices, or a combination thereof, but the present disclosure is not limited thereto. In some embodiments, the calibration module 40 may adjust the current of the proton beam by controlling the accelerator 10 according to the first current value as measured by the current-measuring component 420.

In some embodiments, the calibration module 40 further includes a Faraday cup (FC) component 430. The Faraday cup component 430 optionally shields the proton beam and measures the proton beam to obtain a second current value. For example, by making the Faraday cup component 430 down to the proton beamline (i.e., placing the Faraday cup component 430 in the path of the proton beam), the proton beam may be shielded, while the proton beam is measured to obtain the second current value. Conversely, by making the Faraday cup component 430 rise off the proton beamline (i.e., the Faraday cup component 430 is moved away from the path of the proton beam), the proton beam may be allowed to pass. In some embodiments, the calibration module 40 may adjust the current of the proton beam by controlling the accelerator 10 according to the second current value as measured by the Faraday cup component 430.

In some embodiments, the second current value as measured by the Faraday cup component 430 is more accurate than the first current value as measured by the current-measuring component 420. In other words, calibrating the accelerator 10 with the second current value is more accurate than calibrating the accelerator 10 with the first current value. For example, a plurality of measurements may be performed to get a correspondence table between the first current value and the second current value. Then, when the Faraday cup component 430 is risen off the proton beamline, the second current value may be inferred from the first current value by the correspondence table, so as to accurately calibrate the accelerator 10 according to the second current value.

Figure 3:
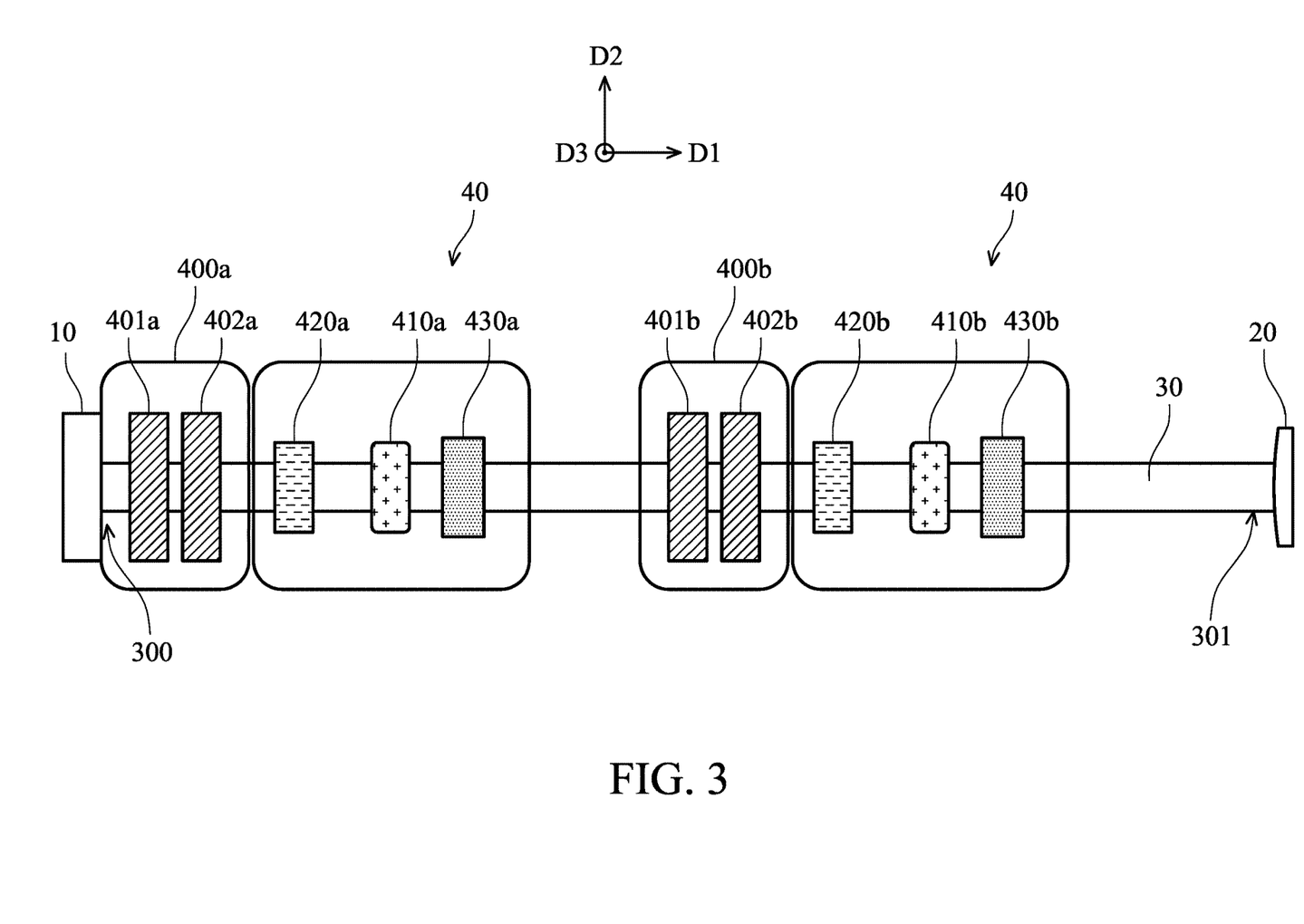
FIG. 3 is a schematic diagram of an accelerator, a calibration module, and a target according to other embodiments of the present disclosure.

Referring to FIG. 3, which is a schematic diagram of an accelerator, a calibration module, and a target according to other embodiments of the present disclosure. As shown in the figure, the channel 30 has a first side 300 and a second side 301 opposite the first side 300. The accelerator 10 is disposed on the first side 300, and the target 20 is disposed on the second side 301. In other words, the accelerator 10 and the target 20 are respectively located at two ends of the channel 30. In some embodiments, by disposing the same components of the calibration module 40 on the first side 300 of the channel 30 and the second side 301 of the channel 30, the proton beam just leaving the accelerator 10 and the proton beam about to irradiate onto the target 20 may be respectively calibrated. Taking FIG. 3 as an example, the details are as follows.

In some embodiments, the pair of electromagnet components 400 may include a first group of quadrupole magnets 400a and a second group of quadrupole magnets 400b spaced apart from each other. The first group of quadrupole magnets 400a and the second group of quadrupole magnets 400b are configured to control the distribution of the proton beam in the second direction D2 and in the third direction D3. For example, a first group of quadrupole magnets 400a is disposed on the first side 300 of the channel 30 (i.e., the end adjacent to the accelerator 10), and may include a quadrupole magnet 401a and a quadrupole magnet 402a. The second group of quadrupole magnets 400b is disposed on the second side 301 of the channel 30 (i.e., the end adjacent to the target 20), and may include a quadrupole magnet 401b and a quadrupole magnet 402b. The quadrupole magnet 401a and the quadrupole magnet 401b are configured to control the distribution of the proton beam in the second direction D2, and the quadrupole magnet 402a and the quadrupole magnet 402b are configured to control the distribution of the proton beam in the third direction D3. Accordingly, the profile distribution of the proton beam may be calibrated on the first side 300 and the second side 301 of the channel 30 respectively.

Similar to the configuration of the pair of electromagnet components 400, in some embodiments, the profile-measuring component 410 may include a first profile-measuring component 410a and a second profile-measuring component 410b. The current-measuring component 420 includes a first current-measuring component 420a and a second current-measuring component 420b. The Faraday cup component 430 includes a first Faraday cup 430a and a second Faraday cup 430b. For example, the first profile-measuring component 410a, the first current-measuring component 420a, and the first Faraday cup 430a are disposed on the first side 300 of the channel 30 (i.e., the end adjacent to the accelerator 10). The second profile-measuring component 410b, the second current-measuring component 420b, and the second Faraday cup 430b are disposed on the second side 301 of the channel 30 (i.e., the end adjacent to the target 20). Accordingly, the current and profile distribution of the proton beam at the sensing devices on the first side 300 of the channel 30 and the current and profile distribution of the proton beam at the sensing devices on the second side 301 of the channel 30 may be measured respectively. It should be noted that the present disclosure is not limited to the mount positions and numbers of the pair of electromagnet components 400, the profile-measuring component 410, the current-measuring component 420, and the Faraday cup component 430 shown in FIG. 2 and FIG. 3. In some embodiments, the number of each component of the calibration module 40 of the present disclosure may be any positive integer, and may be disposed in different positions in the channel 30 according to requirements.

Still referring to FIG. 1, in some embodiments, the neutron beam source generation system 1 further includes a safety module 50 and a safety interlock system 3. Specifically, the safety module 50 is configured to monitor the operating process of the neutron beam source generation system 1, and the safety interlock system 3 may stop the operation of the neutron beam source generation system 1 or raise an alarm according to the data as measured by the calibration module 40 and the data as measured by the safety module 50 of the neutron beam source stabilization control system 2. By disposing the safety interlock system 3 and the safety module 50, the safety of the neutron beam source generation system 1 may be effectively ensured. In some embodiments, the safety interlock system 3 may include a processor to send instructions to the accelerator 10 or other alarm devices. For example, the processor may include a central processing unit (CPU), a microprocessor (MPU), other suitable processors, or a combination thereof, but the present disclosure is not limited thereto.

In some embodiments, the safety module 50 may include a vacuum-measuring component 500 for measuring the channel 30 to obtain a vacuum value. In some embodiments, the vacuum-measuring component 500 may be or include a resistive gauge, a capacitive gauge, other suitable gauges, or a combination thereof, but the present disclosure is not limited thereto. In some embodiments, when the vacuum value as measured by the vacuum-measuring component 500 deviates from a safe value (for example, the vacuum value is lower than a safe value), the operation of the accelerator 10 may be stopped by the safety interlock system 3.

In some embodiments, the neutron beam source generation system 1 further includes a cooling module 60 for cooling the target 20. In some embodiments where the neutron beam source generation system 1 includes a cooling module 60, the safety module 50 may include a cooling-water measuring component 510. The cooling-water measuring component 510 is configured to measure cooling water in the cooling module 60 to obtain a water temperature value, a water pressure value, a water flow value, and a water resistivity value. In some embodiments, when the water temperature value, the water pressure value, the water flow value, or the water resistivity value as measured by the cooling-water measuring component 510 deviates from a safe value (for example, the water temperature value is higher than a safe value), the operation of the accelerator 10 may be stopped by the safety interlock system 3.

In some embodiments, the safety module 50 may include a neutron measuring component 520 for measuring a neutron beam source to obtain a neutron counting rate. In some embodiments, the neutron measuring component 520 may be or may include Helium -3 ($^3$He) neutron proportional counters, boron trifluoride (BF) neutron proportional counters, other suitable measuring devices, or combinations thereof, but the present disclosure is not limited thereto. In some embodiments, when the neutron counting rate as measured by the neutron measuring component 520 deviates from a safe value (for example, the neutron counting rate is higher than a safe value), the operation of the accelerator 10 may be stopped by the safety interlock system 3.

Figure 4:
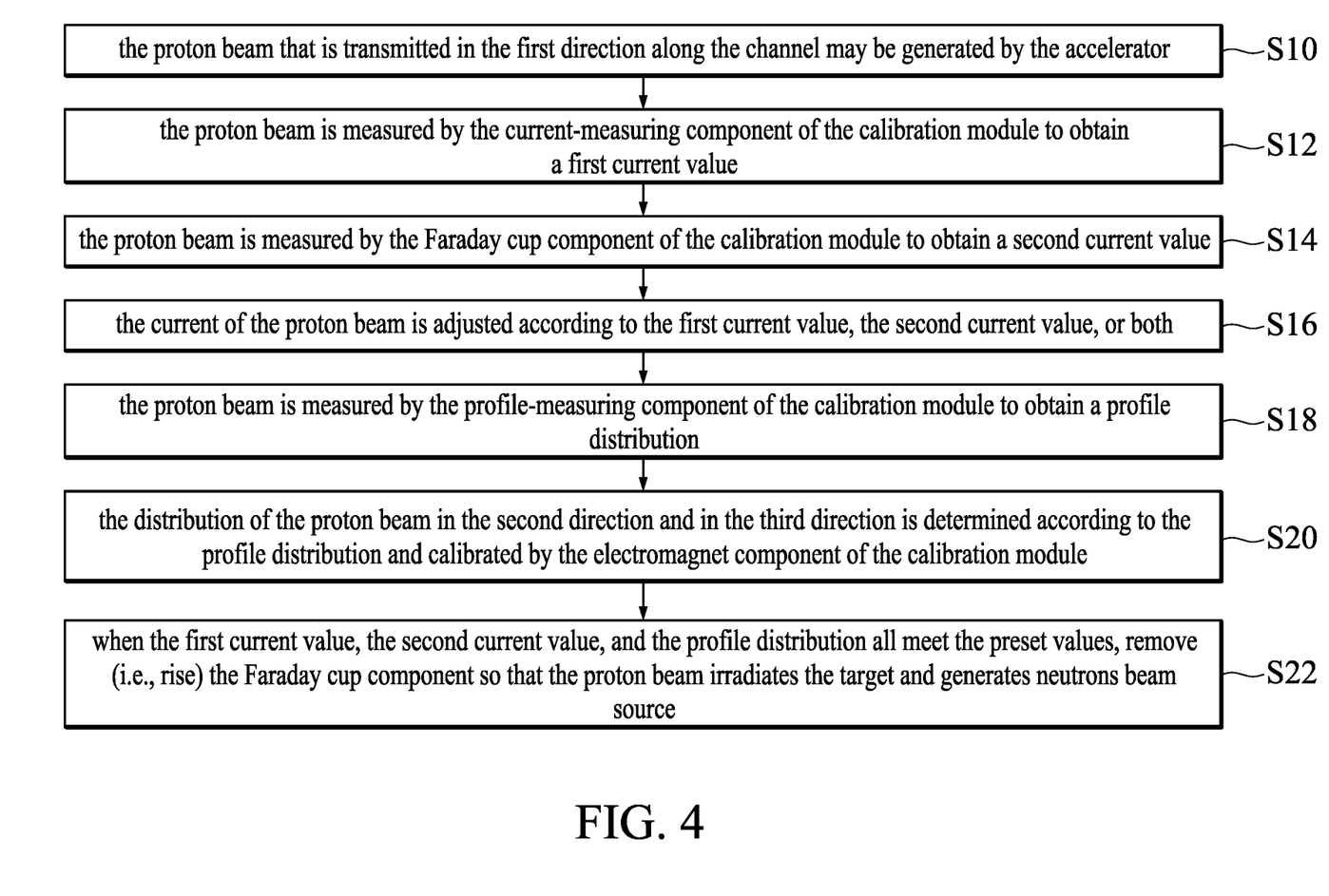
FIG. 4 is a flowchart of a neutron beam source generation method according to some embodiments of the present disclosure.

Referring to FIG. 4, which is a flowchart of a neutron beam source generation method according to some embodiments of the present disclosure. In some embodiments, the neutron beam source may be stably generated by implementing a neutron beam source generation method in the neutron beam source generation system 1 described above. In some embodiments, the neutron beam source generation method may include a neutron beam source stabilization control method for calibrating the proton beam prior to generate the neutron beam source. For example, the neutron beam source stabilization control method may include step S10 to step S22. In step S10, the proton beam that is transmitted in the first direction along the channel may be generated by the accelerator. In step S12, the proton beam may be as measured by the current-measuring component of the calibration module to obtain the first current value. In step S14, the proton beam may be as measured by the Faraday cup component of the calibration module to obtain a second current value. In some embodiments, after step S12 and step S14, the neutron beam source generation method further includes comparing the first current value and the second current value to obtain a current correspondence table. Since the accuracy of the second current value may be higher than that of the first current value, the second current value may be inferred from the first current value according to the current correspondence table during the process of generating the neutron beam source (the Faraday cup component is in a off beamline mode), so as to determine the current magnitude of the proton beam more accurately. In step S16, the current of the proton beam may be adjusted according to the first current value, the second current value, or both. For example, the current of the proton beam may be determined according to the first current value or the second current value. Alternatively, the current of the proton beam may also be determined according to the first current value and the second current value respectively. In step S18, the proton beam is as measured by the profile-measuring component of the calibration module to obtain a profile distribution. In step S20, the distribution of the proton beam in the second direction and in the third direction is determined according to the profile distribution and calibrated by the pair of electromagnet components of the calibration module. In step S22, when the first current value, the second current value, and the profile distribution all meet the preset values, remove (i.e., rise) the Faraday cup component so that the proton beam irradiates the target and generates neutrons beam source.

In some embodiments, the above step S10 to step S16 may be collectively referred to as a current value quality control method. In some embodiments, step S18 to step S20 may be collectively referred to as a profile quality control method. In some embodiments, the current value quality control method may be performed first, and then the profile quality control method may be performed. Specifically, when the current of the proton beam increases, the space charge force inside the proton beam increases so that the proton beam spreads out (for example, the distribution area increases). Conversely, when the current of the proton beam decreases, the space charge force inside the proton beam decreases so that the proton beam focuses (for example, the distribution area decreases). In other words, the profile distribution of the proton beam will be affected by the magnitude of the current. Therefore, performing the current value quality control method first may prevent the calibrated profile distribution from being affected by changing the magnitude of the current.

Figure 5:
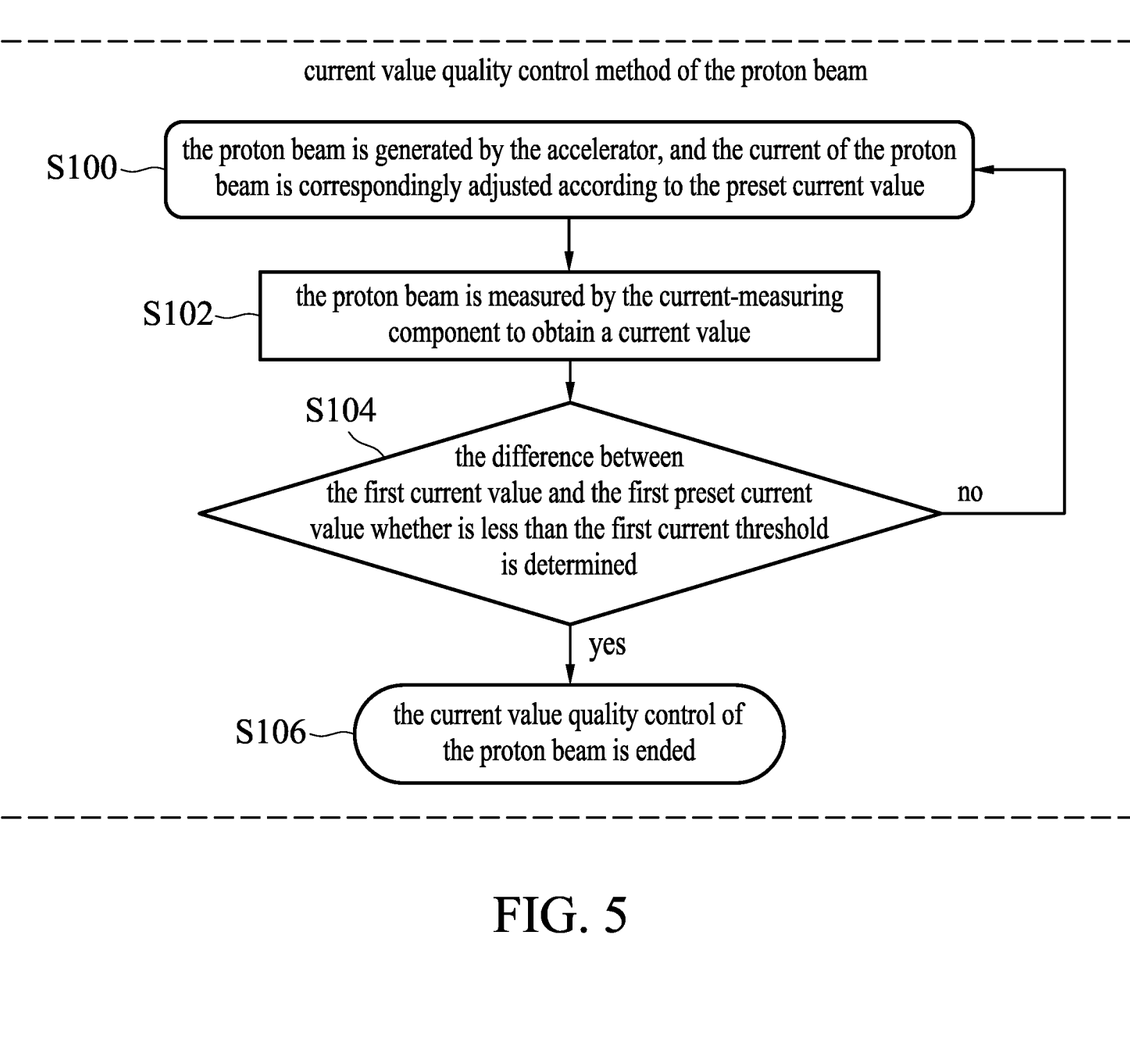
FIG. 5 is a flowchart of a current value quality control method according to some embodiments of the present disclosure.

Referring to FIG. 5, which is a flowchart of a current value quality control method according to some embodiments of the present disclosure. In some embodiments, the current value quality control method may be replaced and performed by step S100 to step S106. In step S100, the proton beam is generated by the accelerator, and the current of the proton beam is correspondingly adjusted according to the first preset current value. In step S102, the proton beam is as measured by the current-measuring component to obtain a first current value. In step S104, the difference between the first current value and the first preset current value whether is less than the first current threshold is determined. When the difference between the first current value and the first preset current value is less than the first current threshold, it is determined that the first current value of the proton beam passes the quality control. Conversely, when the difference between the first current value and the first preset current value is greater than or equal to the first current threshold, it is determined that the first current value of the proton beam cannot pass the quality control, and step S100 is performed again. In some embodiments, the first current threshold is 5% of the first preset current value, but the present disclosure is not limited thereto. In other embodiments, the first current threshold may be any value, such as 3%, 10%, 15%, and the like of the first preset current value. In step S106, the current value quality control of the proton beam is ended.

In some embodiments, a Faraday cup component may be used instead of the current-measuring component in step S102. For example, the proton beam may be as measured by a Faraday cup component to obtain the second current value. Next, the difference between the second current value and the second preset current value whether is less than the second current threshold is determined. When the difference between the second current value and the second preset current value is less than the second current threshold, it is determined that the second current of the proton beam passes the quality control. Conversely, when the difference between the second current value and the second preset current value is greater than or equal to the second current threshold, it is determined that the second current of the proton beam cannot pass the quality control, and step S100 is performed again.

Figure 6:
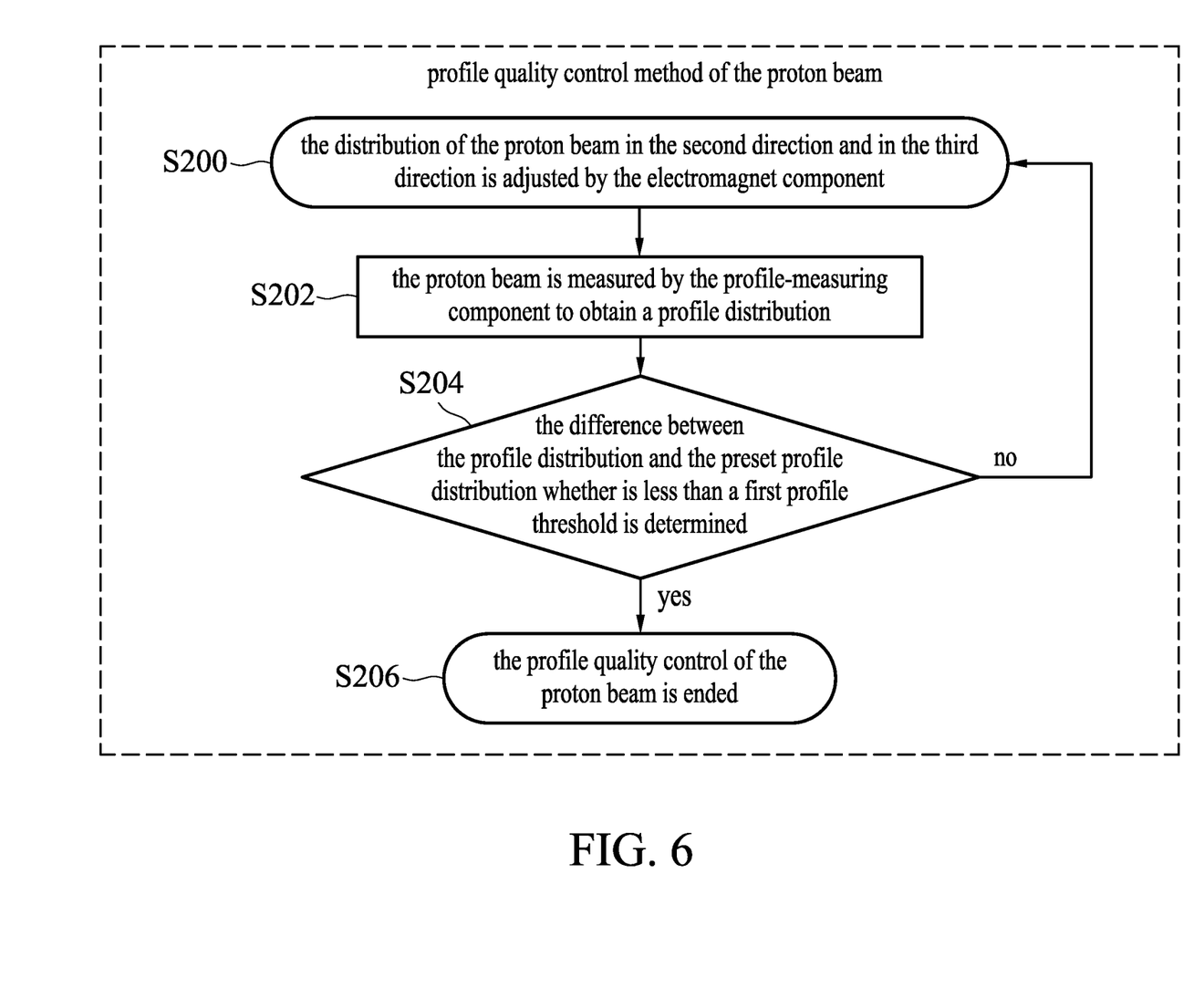
FIG. 6 is a flowchart of a profile quality control method according to some embodiments of the present disclosure.

Refer to FIG. 6, which is a flow chart of a profile quality control method according to some embodiments of the present disclosure. In some embodiments, the profile quality control method may be replaced and performed by step S200 to step S206. In step S200, the distribution of the proton beam in the second direction and in the third direction is adjusted by the pair of electromagnet components. In step S202, the proton beam is as measured by the profile-measuring component to obtain a profile distribution. In step S204, the difference between the profile distribution and the preset profile distribution whether is less than a first profile threshold is determined. When the difference between the profile distribution and the preset profile distribution is less than the profile threshold, it is determined that the profile distribution of the proton beam passes the quality control. Conversely, when the difference between the profile distribution and the preset profile distribution is greater than or equal to the profile threshold, it is determined that the profile distribution of the proton beam cannot pass the quality control, and step S200 is performed again. The "difference between the profile distribution and the preset profile distribution" herein may refer to the difference in area between the distribution area and the preset area of the proton beam, but the present disclosure is not limited thereto. In some embodiments, the profile threshold may be 5% of the preset profile distribution. In step S206, the profile quality control of the proton beam is ended.

Figure 7A:
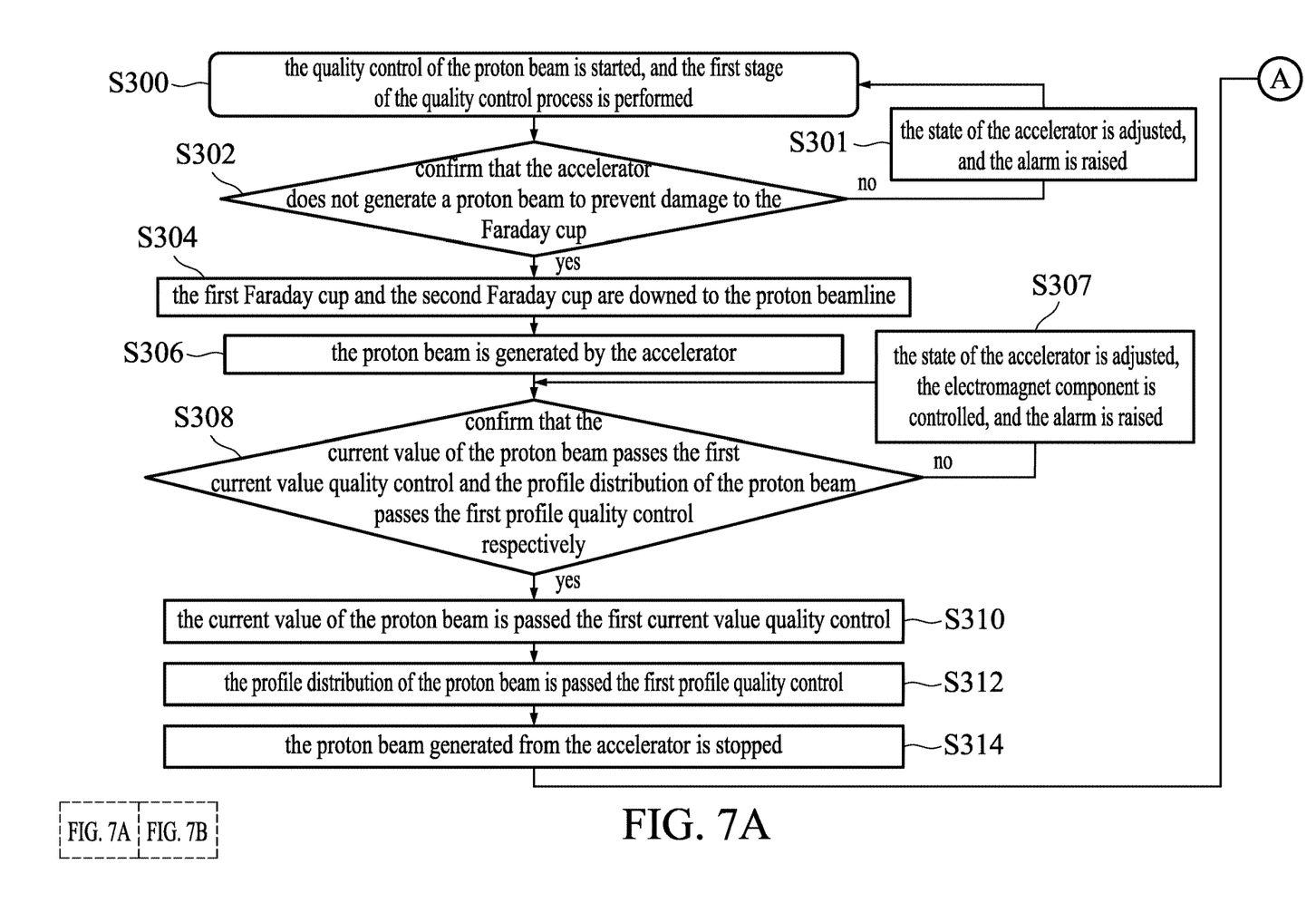
FIG. 7A and FIG. 7B are a flowchart of a neutron beam source stabilization control method according to some embodiments of the present disclosure.
Figure 7B:
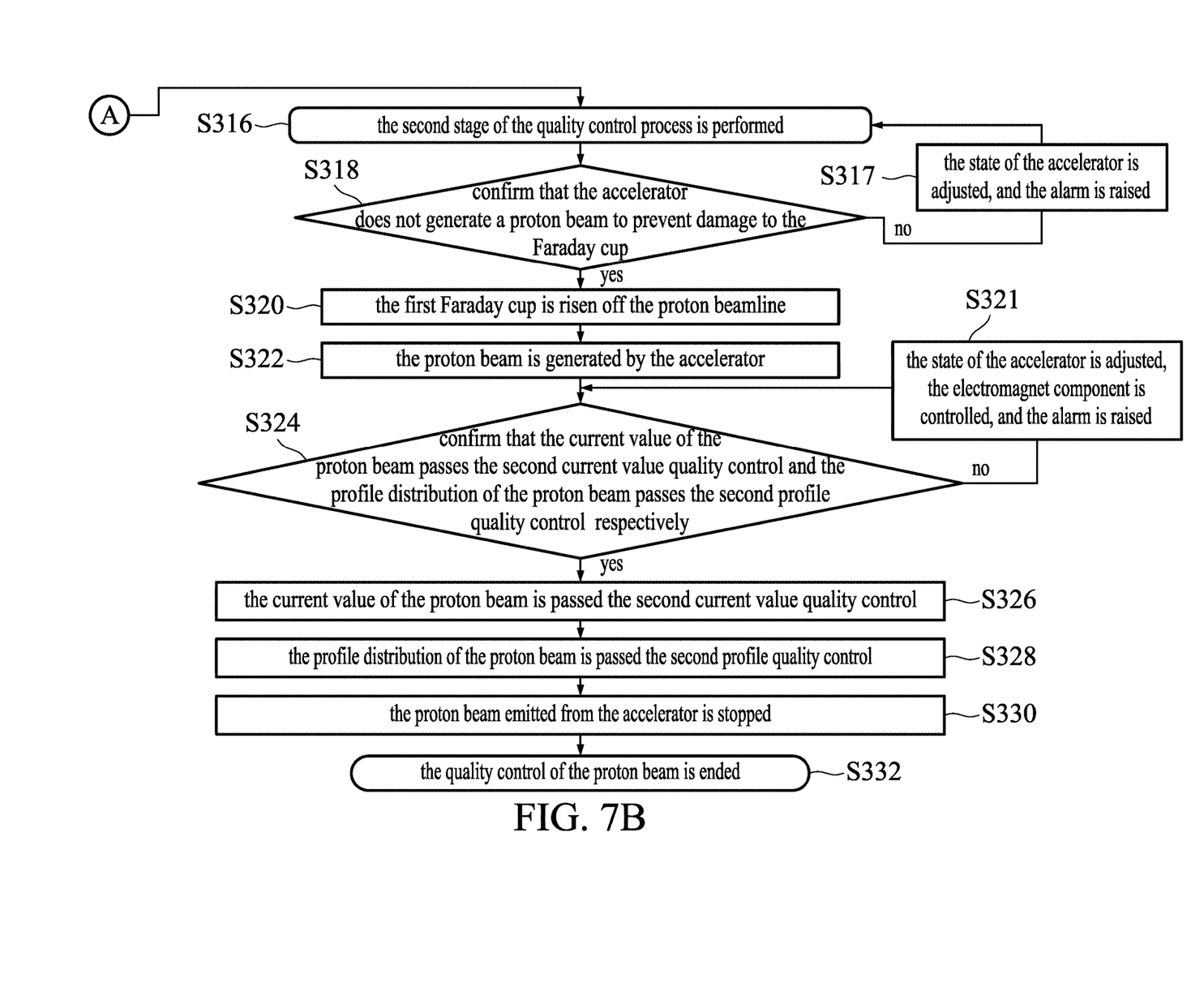

Refer to FIG. 7A and FIG. 7B, which are a flowchart of a neutron beam source stabilization control method according to some embodiments of the present disclosure. In some embodiments, both sides of the channel of the neutron beam source generation system are provided with the pair of electromagnet components, the profile-measuring components, the current-measuring components, and the Faraday cup components (for example, the neutron beam source generation system has a configuration shown in FIG. 3). In this case, the neutron beam source stabilization control method may be replaced and performed by step S300 to step S332, and the steps may be divided into two stages.

In step S300, the quality control of the proton beam is started, and the first stage of the quality control process is performed. In step S302, confirm that the accelerator does not generate a proton beam to prevent damage to the Faraday cup. When the accelerator generates a proton beam, step S301 is performed and step S300 is performed again. In step S301, the state of the accelerator is adjusted (for example, the accelerator is turned off) to stop generating the proton beam, and an alarm is raised by devices such as a speaker and a warning light, but the present disclosure is not limited thereto. In step S304, the first Faraday cup and the second Faraday cup is downed to the proton beamline. In step S306, the proton beam is generated by the accelerator. From step S308 to step S312, whether the current of the proton beam passes the first current value quality control and the profile distribution of the proton beam passes the first profile quality control is respectively confirmed. When the current and/or profile distribution of the proton beam cannot pass the first current value quality control or the first profile quality control, step S307 is performed and step S308 is performed again. In some embodiments, step S307 and step S308 may be similar or identical to the current value quality control method mentioned above (for example, step S10 to step S16, or step S100 to step S106) and profile quality control method (for example, step S18 to step S20, or step S200 to step S206) to perform. In step S314, the proton beam generated from the accelerator is stopped.

In step S316, the second stage of the quality control process is performed. Specifically, in step S316 to step S332, the quality control process similar or identical to that of step S300 to step S314 may be performed again, so the relevant description is omitted. It should be noted that in the first stage of the quality control process (step S300 to step S314), the proton beam is shielded by the first Faraday cup (e.g., step S304). In other words, in the first stage of the quality control process, the main purpose is to measure and control the profile and current of the proton beam between the accelerator and the first Faraday cup. On the other hand, in the second stage of the quality control process (step S316 to step S332), since the first Faraday cup rises, the proton beam is shielded by the second Faraday cup (e.g., step S320). In other words, in the second stage of the quality control process, the main purpose is to measure and control the profile and current of the proton beam between the first Faraday cup and the second Faraday cup. With two times of current value quality control and two times of profile quality control, a more stable proton beam may be produced. In step S332, after the proton beam has passed the two stages of the quality control process, the quality control of the proton beam is ended.

In some embodiments, the neutron beam source generation method further includes a neutron beam source stable generation method for calibrating the proton beam during the process of generating the neutron beam source. For example, after the Faraday cup component is removed, the neutron beam source generation method further includes the following steps. Measuring the proton beam with the current-measuring component to obtain a first current value. Adjusting the current value of the proton beam according to the first current value. Measuring the proton beam with the profile-measuring component to obtain the profile distribution. Adjusting the profile distribution of the proton beam in the second direction and in the third direction according to the profile distribution using the pair of electromagnet components. In other words, some components of the calibration module may be used to calibrate the proton beam before generating the neutron beam source, and may also be used to calibrate the proton beam during the process of generating the neutron beam source.

Figure 8:
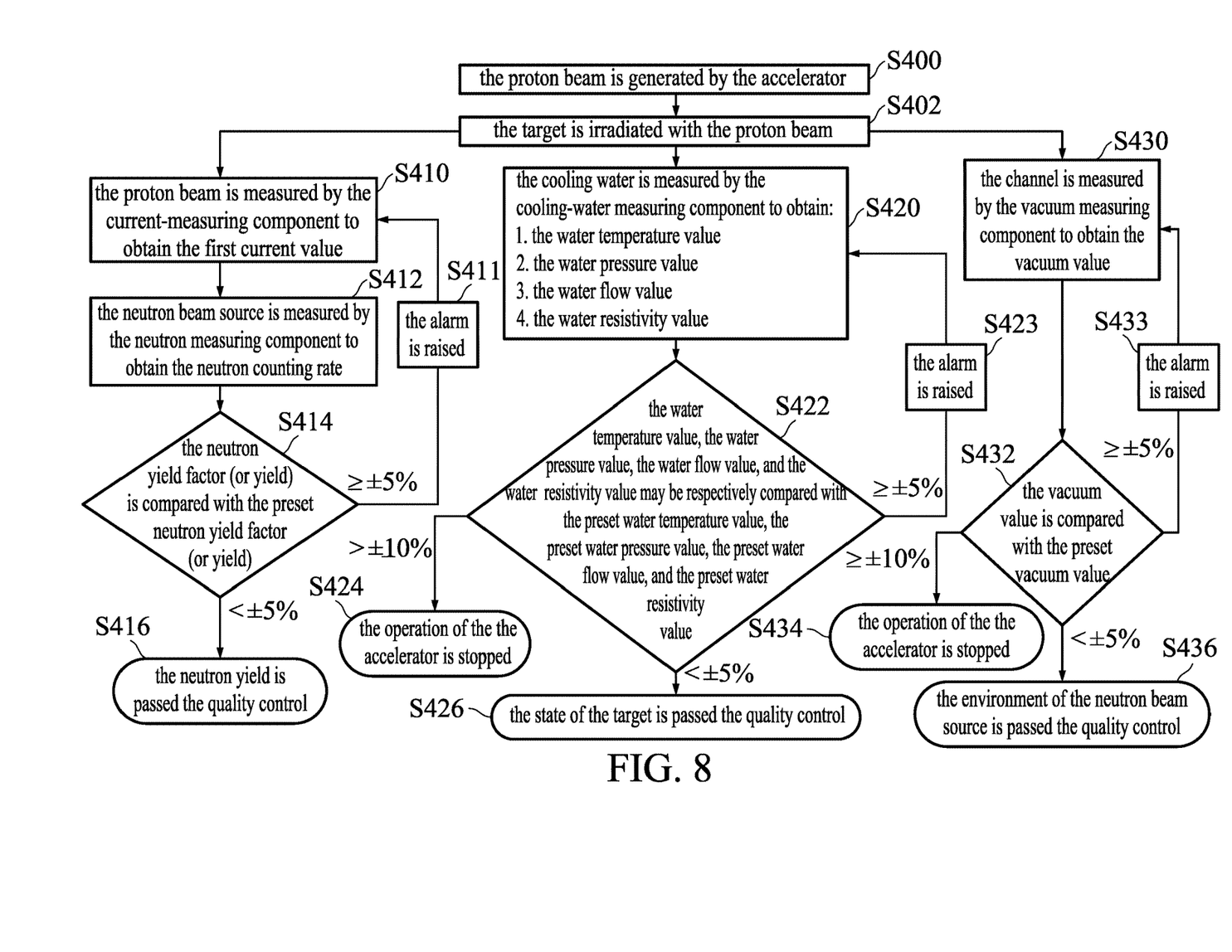
FIG. 8 is a flowchart of a safety interlock method according to some embodiments of the present disclosure.

Refer to FIG. 8, which is a flowchart of a safety interlock method according to some embodiments of the present disclosure. In some embodiments, the neutron beam source generation method may further include a safety interlock method for confirming the safety of the system during the process of generating the neutron beam source. In some embodiments, the safety interlock method may include step S400 to step S402, step S410 to step S416, step S420 to step S426, and step S430 to step S436. A detailed description of each step is as follow. In step S400 and step S402, the proton beam may be generated by the accelerator, and the neutron beam source may be generated by irradiating the target with the proton beam.

In some embodiments, step S410 to step S416 are used to confirm whether the yield of the neutron beam source passes the quality control. Specifically, in step S410, the proton beam may be as measured by the current-measuring component of the calibration module to obtain the first current value. In step S412, the neutron beam source may be as measured by the neutron measuring component of the safety module to obtain the neutron counting rate. As used herein, the term "neutron counting rate" refers to the number of neutrons as measured by a device such as a proportional counter. In some embodiments, the number of neutrons may be inferred from the number of pulses as measured by a proportional counter. In step S414, the neutron counting rate may be divided by the first current value to obtain a first neutron yield factor, and the first neutron yield factor is compared with a first preset neutron yield factor. When the difference between the first neutron yield factor and the first preset neutron yield factor is greater than or equal to the first neutron yield factor threshold, safety interlock control is performed. In some embodiments, the first neutron yield factor threshold may be 5% of the first preset neutron yield factor, but the present disclosure is not limited thereto. In some embodiments, the safety interlock control may include performing step S411 (i.e., raising an alarm) and re-preforming step S410. Alternatively, in step S414, the neutron counting rate may be first converted into a neutron flux, and the neutron flux may be divided by the first current value to obtain the first neutron yield rate. As used herein, the term "neutron flux" refers to the number of neutrons passing by a unit area per unit time. In some embodiments, the term "neutron flux" is equal to the product of neutron density and its average velocity. Next, the first neutron yield may be compared with the first preset neutron yield. When the difference between the first neutron yield and the first preset neutron yield is greater than or equal to a first neutron yield threshold, safety interlock control is performed.

In some embodiments, after the step S410, the second current value may be inferred from the first current value according to the correspondence table between the first current value and the second current value. Next, in step S414, the neutron counting rate may be divided by the second current value to obtain the second neutron yield factor, and the second neutron yield factor is compared with the second preset neutron yield factor. When the difference between the second neutron yield factor and the second preset neutron yield factor is greater than or equal to the second neutron yield factor threshold, safety interlock control is performed. By using a more accurate value of the second current, the yield of the neutron beam may be estimated more accurately. Alternatively, in some embodiments, the neutron counting rate may be first converted to a neutron flux, and the neutron flux may be divided by the second current value to obtain the second neutron production rate. Then, the second neutron yield may be compared with the second preset neutron yield. When the difference between the second neutron yield and the second preset neutron yield is greater than or equal to the second neutron yield threshold, safety interlock control is performed. In some embodiments, when the difference between the second neutron yield and the second preset neutron yield is greater than or equal to 5%, the safety interlock control may include performing step S411 (i.e., raising an alarm) and re-preforming step S410. In this case, the disposal is determined by professionals.

In some embodiments, step S420 to step S426 are used to confirm whether the state of the target passes the quality control. Specifically, in step S420, the cooling water in the cooling module may be as measured by the cooling-water measuring component of the calibration module to obtain the water temperature value, the water pressure value, the water flow value, and the water resistivity value. In step S422, the water temperature value, the water pressure value, the water flow value, and the water resistivity value may be respectively compared with the preset water temperature value, the preset water pressure value, the preset water flow value, and the preset water resistivity value. When the difference between the water temperature value and the preset water temperature value is greater than or equal to the water temperature value threshold, the difference between the water pressure value and the preset water pressure value is greater than or equal to the water pressure value threshold, the difference between the water flow value and the preset water flow value is greater than or equal to the water flow value threshold, or the difference between the water flow resistivity value and the preset water resistivity value is greater than or equal to the threshold of the water resistivity value, the safety interlock control is performed. In some embodiments, when the difference between any of the above parameters and the corresponding preset parameters is greater than or equal to 5%, the safety interlock control may include performing step S423 (i.e., raising an alarm) and then re-preforming step S420. In this case, the disposal is determined by professionals. In some embodiments, when the difference between any of the above parameters and the corresponding preset parameter is greater than or equal to 10%, the safety interlock control may include performing step S424 to stop the accelerator using the safety interlock system.

In some embodiments, step S430 to step S436 are used to confirm whether the environment of the neutron beam source passes the quality control. Specifically, in step S430, the channel may be as measured by the vacuum-measuring component of the calibration module to obtain the vacuum value. In step S432, the vacuum value may be compared with the preset vacuum value. When the difference between the vacuum value and the preset vacuum value is greater than or equal to the threshold of the vacuum value, safety interlock control is performed. In some embodiments, when the difference between the vacuum value and the preset vacuum value is greater than or equal to 5%, the safety interlock control may include performing step S433 (i.e., raising an alarm) and re-preforming step S430. In this case, the disposal is determined by professionals. In some embodiments, when the difference between the vacuum value and the preset vacuum value is greater than or equal to 10%, the safety interlock control may include performing step S434 to stop the accelerator with the safety interlock system.

It should be noted that, although a difference of 5% or 10% is used herein to determine whether to perform steps such as adjusting the accelerator, raising an alarm, or stopping the accelerator by a safety interlock system, the disclosure is not limited thereto. For example, the difference used to determine in any one of steps S104, S204, S411, S416, S423, and S433 may be replaced to other values, such as 2%, 3%, 4%, 6%, 7%, 8%, any range of the above values, or other suitable values. Alternatively, the difference used to determine in any one of steps S424 and S434 may be changed to other values, such as 7%, 8%, 9%, 11%, 12%, 13%, any range of the above values, or other suitable values. In other words, the differences used herein are examples and may be adjusted according to actual needs.

The features between the embodiments of the present disclosure may be arbitrarily combined as long as they do not violate or conflict with the spirit of the present disclosure. In addition, the scope of the present disclosure is not limited thereto the process, machine, manufacturing, material composition, device, method, and step in the specific embodiments described in the specification. A person of ordinary skill in the art will understand current and future process, machine, manufacturing, material composition, device, method, and step from the content disclosed in the present disclosure, as long as the current or future process, machine, manufacturing, material composition, device, method, and step performs substantially the same functions or obtain substantially the same results as the present disclosure. Therefore, the scope of the present disclosure includes the above process, machine, manufacturing, material composition, device, method, and steps. The scope of the present disclosure should be determined by the scope of the claims. It is not necessary for any embodiment or claim of the present disclosure to achieve all of the objects, advantages, and/or features disclosed herein.

The foregoing outlines several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A neutron beam source generation system, comprising:
   an accelerator for generating a proton beam that is transmitted in a first direction along a channel;
   a target at one end of the channel, wherein a neutron beam source is generated by irradiating the target with the proton beam; and
   a calibration module disposed in the channel, wherein the calibration module comprises:
   a pair of electromagnet components for controlling a distribution of the proton beam in a second direction and in a third direction;
   a profile-measuring component for measuring the proton beam to obtain a profile distribution;
   a current-measuring component for measuring the proton beam to obtain a first current value; and
   a Faraday cup component for optionally shielding the proton beam and measuring the proton beam to obtain a second current value,
   wherein the calibration module controls the distribution of the proton beam in the second direction and in the third direction using the pair of electromagnet components according to the profile distribution, and the calibration module adjusts a current of the proton beam according to the first current value, the second current value, or both.

2. The neutron beam source generation system as claimed in claim 1, further comprising a safety module and a safety interlock system for performing a safety interlock control on the neutron beam source generation system using the calibration module and the safety module.

3. The neutron beam source generation system as claimed in claim 2, further comprising a cooling water for cooling the target,
   wherein the safety module is configured to monitor a vacuum state of the channel, a state of the cooling water, and an intensity of the neutron beam source.

4. The neutron beam source generation system as claimed in claim 3, wherein the safety module comprises:
   a vacuum-measuring component for measuring the channel to obtain a vacuum value;
   a cooling-water measuring component for measuring the cooling water to obtain a water temperature value, a water pressure value, a water flow value, and a water resistivity value; and
   a neutron measuring component for measuring the neutron beam source to obtain a neutron counting rate.

5. The neutron beam source generation system as claimed in claim 1, wherein the channel has a first side and a second side opposite to the first side, the accelerator is disposed on the first side, and the target is disposed on the second side,
   wherein the pair of electromagnet components comprise a first group of quadrupole magnets and a second group of quadrupole magnets, the profile-measuring component comprises a first profile-measuring component and a second profile-measuring component, the current-measuring component comprises a first current-measuring component and a second current-measuring component, and the Faraday cup component comprises a first Faraday cup and a second Faraday cup, wherein the accelerator, the first group of quadrupole magnets, the first profile-measuring component, the first current-measuring component, and the first Faraday cup are adjacent to the first side of the channel, and the target, the second group of quadrupole magnets, the second profile-measuring component, the second current-measuring component, and the second Faraday cup are adjacent to the second side of the channel.

6. The neutron beam source generation system as claimed in claim 1, wherein the pair of electromagnet components comprise a first group of quadrupole magnets and a second group of quadrupole magnets spaced apart from each other, and the first group of quadrupole magnets and the second group of quadrupole magnets are configured to control the distribution of the proton beam in the second direction and in the third direction.

7. The neutron beam source generation system as claimed in claim 1, wherein the first direction, the second direction, and the third direction are perpendicular to each other.

8. A neutron beam source generation method applied to a neutron beam source generation system, wherein the neutron beam source generation system comprises an accelerator, a target, and a calibration module, and the neutron beam source generation method comprises:
generating a proton beam that is transmitted in a first direction along a channel using the accelerator;
measuring the proton beam using a current-measuring component of the calibration module to obtain a first current value;
measuring the proton beam using a Faraday cup component of the calibration module to obtain a second current value;
adjusting a current of the proton beam according to the first current value, the second current value, or both;
measuring the proton beam using a profile-measuring component of the calibration module to obtain a profile distribution;
adjusting a distribution of the proton beam in a second direction and in a third direction according to the profile distribution using a pair of electromagnet components of the calibration module; and
when the first current value, the second current value, and the profile distribution all meet preset values, removing the Faraday cup component of the calibration module so that the proton beam irradiates the target to generate a neutron beam source.

9. The neutron beam source generation method as claimed in claim 8, wherein after removing the Faraday cup component of the calibration module, the neutron beam source generation method further comprises:
measuring the proton beam using the current-measuring component of the calibration module to obtain the first current value;
adjusting the current of the proton beam according to the first current value;
measuring the proton beam using the profile-measuring component of the calibration module to obtain the profile distribution; and
adjusting the distribution of the proton beam in the second direction and in the third direction using the pair of electromagnet components of the calibration module according to the profile distribution.

10. The neutron beam source generation method as claimed in claim 8, wherein the step of adjusting the distribution of the proton beam in the second direction and in the third direction according to the profile distribution using the pair of electromagnet components of the calibration module comprises:
comparing a preset profile distribution with the profile distribution; and
when a difference between the preset profile distribution and the profile distribution is greater than a profile threshold, adjusting the distribution of the proton beam in the second direction, the third direction, or both.

11. The neutron beam source generation method as claimed in claim 8, wherein the step of adjusting the current of the proton beam according to the first current value, the second current value, or both comprises:
comparing a first preset current value with the first current value; and
when a difference between the first preset current value and the first current value is greater than a first current threshold, adjusting the current of the proton beam.

12. The neutron beam source generation method as claimed in claim 8, wherein the step of adjusting the current of the proton beam according to the first current value, the second current value, or both comprises:
comparing a second preset current value with the second current value; and
when a difference between the second preset current value and the second current value is greater than a second current threshold, adjusting the current of the proton beam.

13. The neutron beam source generation method as claimed in claim 8, wherein the neutron beam source generation system further comprises a cooling water for cooling the target, and the neutron beam source generation method further comprises:
monitoring a vacuum state of the channel, a state of the cooling water, and an intensity of the neutron beam source using a safety module; and
performing a safety interlock control on the neutron beam source generation system using a safety interlock system according to a current of the proton beam as measured by the calibration module and the vacuum state of the channel, the state of the cooling water, and the intensity of the neutron beam source as monitored by the safety module.

14. The neutron beam source generation method as claimed in claim 13, wherein the step of monitoring the vacuum state of the channel using the safety module comprises:
measuring the channel with a vacuum-measuring component of the safety module to obtain a vacuum value.

15. The neutron beam source generation method as claimed in claim 14, wherein after the step of measuring the channel with the vacuum-measuring component of the safety module to obtain the vacuum value, the neutron beam source generation method further comprises:
comparing a preset vacuum value with the vacuum value; and
when a difference between the preset vacuum value and the vacuum value is greater than a vacuum threshold, stopping the accelerator using the safety interlock system.

16. The neutron beam source generation method as claimed in claim 13, wherein the step of monitoring the state of the cooling water using the safety module comprises:
measure the cooling water with a cooling-water measuring component of the safety module to obtain a water temperature value, a water pressure value, a water flow value, and a water resistivity value.

17. The neutron beam source generation method as claimed in claim 16, wherein after measuring the cooling water with the cooling-water measuring component of the safety module to obtain the water temperature value, the water pressure value, the water flow value, and the water resistivity value, the neutron beam source generation method further comprises:
comparing a preset water temperature value with the water temperature value, a preset water pressure value with the water pressure value, a preset water flow value with the water flow value, and a preset water resistivity value with the water resistivity value; and
when a difference between the preset water temperature value and the water temperature value is greater than a water temperature value threshold, a difference between the preset water pressure value and the water pressure value is greater than a water pressure value threshold, a difference between the preset water flow value and the water flow value is greater than a water flow value threshold, or a difference between the preset water resistivity value and the water resistivity value is greater than a water resistivity value threshold, the accelerator is stopped using the safety interlock system.

18. The neutron beam source generation method as claimed in claim 13, wherein the step of monitoring the intensity of the neutron beam source using the safety module comprises:
measuring the neutron beam source with a neutron measuring component of the safety module to obtain a neutron counting rate.

19. The neutron beam source generation method as claimed in claim 18, wherein after the step of measuring the neutron beam source with the neutron measuring component of the safety module to obtain the neutron counting rate, the neutron beam source generation method further comprises:
dividing the neutron counting rate by the first current value to obtain a first neutron yield factor;
comparing a first preset neutron yield factor with the first neutron yield factor; and
when a difference between the first preset neutron yield factor and the first neutron yield factor is greater than a first neutron yield factor threshold, stopping the accelerator using the safety interlock system.

20. The neutron beam source generation method as claimed in claim 18, wherein before removing the Faraday cup component of the calibration module, the neutron beam source generation method further comprises:
comparing the first current value and the second current value to obtain a current correspondence table; and
after obtaining the neutron counting rate, the neutron beam source generation method further comprises:
inferring the second current value from the first current value as measured by the current-measuring component of the calibration module according to the current correspondence table;
dividing the neutron counting rate by the second current value to obtain a second neutron yield factor;
comparing a second preset neutron yield factor with the second neutron yield factor; and
when a difference between the second preset neutron yield factor and the second neutron yield factor is greater than a second neutron yield factor threshold, stopping the accelerator using the safety interlock system.

21. A neutron beam source stabilization control system disposed between an accelerator and a target, wherein the accelerator is configured to generate a proton beam that is transmitted in a first direction along a channel, and the target is at one end of the channel and generates a neutron beam source by an irradiation of the proton beam, wherein the neutron beam source stabilization control system comprises:
a calibration module disposed between the accelerator and the target, wherein the calibration module comprises:
a pair of electromagnet components for controlling a distribution of the proton beam in a second direction and in a third direction;
a profile-measuring component for measuring the proton beam to obtain a profile distribution;
a current-measuring component for measuring the proton beam to obtain a first current value; and
a Faraday cup component for optionally shielding the proton beam and measuring the proton beam to obtain a second current value;
wherein the calibration module controls the distribution of the proton beam in the second direction and in the third direction using the pair of electromagnet components according to the profile distribution, and the calibration module adjusts a current of the proton beam according to the first current value, the second current value, or both.

* * * * *